(12) United States Patent
Gupta

(10) Patent No.: US 11,176,541 B1
(45) Date of Patent: Nov. 16, 2021

(54) SMART CARD USING NATURAL LANGUAGE PROCESSING FOR ORIGINATING CONTACTLESS DATA TRANSFER

(71) Applicant: Bank of America Corporation, Charlotte, NC (US)

(72) Inventor: Saurabh Gupta, New Delhi (IN)

(73) Assignee: Bank of America Corporation, Charlotte, NC (US)

(*) Notice: Subject to any disclaimer, the term of this patent is extended or adjusted under 35 U.S.C. 154(b) by 62 days.

(21) Appl. No.: 16/874,872

(22) Filed: May 15, 2020

(51) Int. Cl.
*G06Q 20/00* (2012.01)
*G06Q 20/34* (2012.01)
*G06F 3/16* (2006.01)
*G06Q 20/38* (2012.01)
*G06F 21/32* (2013.01)

(52) U.S. Cl.
CPC ........... *G06Q 20/352* (2013.01); *G06F 3/167* (2013.01); *G06F 21/32* (2013.01); *G06Q 20/341* (2013.01); *G06Q 20/382* (2013.01)

(58) Field of Classification Search
CPC .. G06Q 20/352; G06Q 20/341; G06Q 20/382; G06F 3/167; G06F 21/32
USPC ........................................................ 235/380
See application file for complete search history.

(56) References Cited

U.S. PATENT DOCUMENTS

| | | | |
|---|---|---|---|
| 10,554,411 B1* | 2/2020 | Ashfield | H04L 9/3228 |
| 10,990,961 B1* | 4/2021 | Gupta | G06Q 20/353 |
| 11,107,065 B1* | 8/2021 | Gupta | G06K 19/07707 |
| 2006/0000896 A1 | 1/2006 | Bonalle et al. | |
| 2016/0267486 A1* | 9/2016 | Mitra | H04W 12/041 |
| 2019/0286805 A1 | 9/2019 | Law et al. | |

* cited by examiner

*Primary Examiner* — Daniel A Hess
(74) *Attorney, Agent, or Firm* — Weiss & Arons LLP; Michael A. Springs, Esq.

(57) ABSTRACT

Apparatus and methods are provided for a smart card which enables users to initiate a transaction or money transfer using voice commands. The apparatus and methods may include a smart card. The smart card may be responsive to voice commands and support electronic communication with a payment network. The smart card may include a housing, a network interface controller including a wireless communication interface, a voice controller, an active near-field communication chip, a microprocessor, a battery and/or an activation button. The smart card may also include executable instructions stored in a non-transitory memory, that when run by the microprocessor, detect and capture a first audio message via the voice controller and perform speaker-dependent speech recognition on the captured audio message to identify whether or not an authorized user of the smart card generated the audio message.

20 Claims, 8 Drawing Sheets

SMART CARD USING NATURAL LANGUAGE PROCESSING FOR ORIGINATING CONTACTLESS DATA TRANSFER

FIELD OF TECHNOLOGY

Aspects of the disclosure relate to a smart card with enhanced communication features.

BACKGROUND OF THE DISCLOSURE

Cards that are used for performing transactions may include, embedded in the card, multiple methods of performing transactions. For example, cards can include a magnetic stripe for swiPINg at a card reader device, a Europay, Mastercard and Visa ("EMV") chip for inserting into a device and/or a near-field communication ("NFC") chip for contactless transaction.

NFC is a rapidly growing wireless technology that supports short-range communications. Cards today typically include a passive NFC chip that can transfer information stored on an NFC tag within the card to an NFC-enabled device, such as a smartphone or point-of-sale device, when the chip is activated. Because these cards do not include a battery, an active NFC-enabled device is used to power the NFC chip using a signal when the two are in close proximity. This signal provides sufficient power to the NFC chip to enable it to passively transmit information to the NFC-enabled device.

Cards including passive NFC chips must rely upon other devices to complete a transaction. The NFC chip cannot be used to complete a transaction when a powering device is not available. This is not desirable at least because, if an individual wants to initiate a transaction using his card, a POS or other suitable device is required to complete the transaction.

It would therefore be desirable to provide apparatus and methods for a smart card that can initiate and complete a transaction independent from a point of sale or other devices. In addition to enabling autonomous and peer-to-peer transactions, such apparatus and methods may eliminate the overhead previously needed to complete a transaction, thus improving user experience and providing additional transaction options.

Furthermore, it would be desirable to provide a smart card that can initiate a transaction or money transfer using voice commands only. This is desirable at least because it enables sightless or otherwise physically impaired individuals to interact with the card without having to input any information into a POS device, or, for example, on a keypad or other device included on the card.

Accordingly, it would be desirable to provide apparatus and methods for SMART CARD USING NATURAL LANGUAGE PROCESSING FOR ORIGINATING CONTACTLESS DATA TRANSFER.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
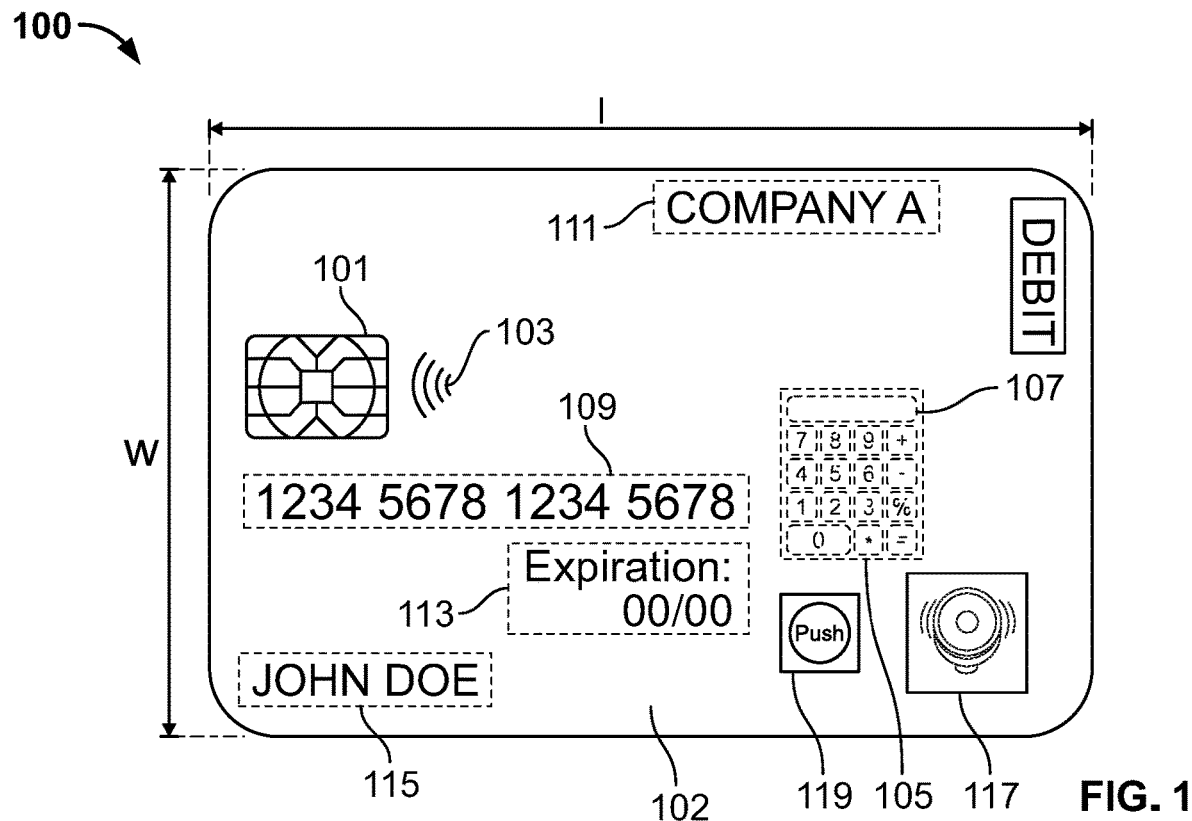
FIG. 1 shows illustrative apparatus in accordance with principles of the disclosure.

A system including apparatus and methods for a smart card with enhanced features is provided. The system may include the smart card. The smart card may be a payment card that includes embedded integrated circuitry. The smart card may be a debit card. The smart card may be both a debit and a credit card. The smart card may be a credit card. The integrated circuitry may be configured to store sensitive transaction information. The integrated circuitry may also be configured execute machine readable instructions that control operation of other components of the smart card.

The smart card may include hardware and associated integrated circuitry for users to complete peer-to-peer transactions, or money transfers, without needing support of a point of sale ("POS") device.

The smart card may have a form factor of 85.60 millimeters ("mm")×53.98 mm×0.8 mm. This form factor may allow for the smart card to fit easily into a user's wallet or pocket. Apparatus included in the smart card, detailed below, may not exceed the form factor of the smart card.

The smart card may have a form factor different from the aforementioned form factor.

The smart card may include a voice controller. The voice controller may include apparatus for generating audio messages, such as a speaker. The voice controller may include a microphone which may accept user provided input. The voice controller may include a sound card.

The smart card may include a screen. The screen may provide a display for providing textual and/or graphical output.

The smart card may include a keypad. The keypad may be a mechanical keypad. The user may depress keys on the keypad to enter information directly into the smart card. The keypad may include, or may be connected to, the screen. The screen may display information input into the keypad. The screen may provide other textual or graphical output. The keypad may include braille above each key on the keypad. Braille on a key may identify, to an unsighted user, a number associated with the key.

The smart card may also include a microprocessor, memory, and a Network Interface Controller ("NIC"). The NIC may be a nano-wireless NIC. The microprocessor may have a thickness that is not greater than 0.25 mm. The microprocessor may control overall operation of the smart card and its associated components. For example, the microprocessor may control operation of the NIC and communication with a transaction gateway. The smart card may include RAM, ROM and an input/output ("I/O") module.

The memory may be a memory card. The memory may include a non-transitory or non-volatile memory.

The transaction gateway may support communications with a payment network. The transaction gateway support communications with a transaction platform. The payment network may be operated by an issuer of the smart card. The transaction platform may be operated by an issuer of the smart card.

The microprocessor may be in electronic communication with the memory. The microprocessor may encrypt data captured by the voice controller, the keypad, and any other suitable data. Illustrative encryption algorithms include RSA cryptography, Blowfish, AES, RC4, RC5, and RC6.

The NIC may be a wireless Network Interface Controller. The NIC may be a microelectromechanical device that fits within the small form factor associated with the smart card. The NIC may include a wireless communication interface ("wireless interface"). The wireless interface may be configured to communicate using any suitable wireless communication protocol. Exemplary wireless communication protocols may include ethernet, Wi-Fi, ZigBee, cellular and NFC. The smart card may also include antenna(s). The antenna(s) may be part of the NIC.

The NIC may prepare data generated by the microprocessor for transmission to the transaction gateway or other secure computer system.

The microprocessor and associated NIC may enable the smart card to establish a secure communication channel. The secure communication channel may be a wireless communication channel, and may be established over a wireless network, such as Wi-Fi. Over the secure communication channel, the smart card may interact with a secure system for completing a money transfer or a purchase. The secure system may be operated by an issuer of the smart card. The secure system may include a secure transaction gateway.

The NIC may include its own dedicated microprocessor and memory. In embodiments when the NIC includes its own dedicated microprocessor and memory, the microprocessor may perform functions different from the functions performed by the NIC's microprocessor.

The smart card may include one or more batteries. A battery of the smart card may be flexible. The battery may be a power source for electronic hardware components of the smart card. For example, the battery may supply power to the keypad, NIC and the microprocessor. The battery may have a thickness that is not greater than 0.5 mm. The battery may power the active NFC chip with no more than 40 mA of power.

The smart card may include a NFC chip. The NFC chip may be an active NFC chip. The battery may power the active NFC chip. The NFC chip may be toggled between a power-on state and a power-off state.

The smart card may include an activation button. The activation button may be a pressure sensitive button or any other suitable button that can be activated by motion, heat, depression, or any other suitable movement. The activation button may have a thickness that is not greater than 0.8 mm. A user may actuate the pressure sensitive to power on or off one or more components of the smart card. For example, actuating the activation button may activate the voice controller, microprocessor, keypad, NFC chip and/or the NIC of the smart card.

Depression of the button may active the voice controller. Activation of the voice controller may trigger the voice controller to begin capturing and analyzing, using Natural Language Processing ("NLP"), audio messages. The NLP may use NLP software to reduce the audio message to digital data. The NLP may use machine learning to compare the audio message to previously captured audio messages.

In some embodiments, depression of the button may toggle the microprocessor between an inactive state—i.e. power-off state—and an active state. Depression of the button may toggle the NFC chip from a power-off state to a power-on state. Depression of the button may toggle the NIC from a power-off state to a power-on state.

In some embodiments, the NIC of the smart card may include an inactive state. When in the inactive state, the NIC may be unable to connect to a communication channel or transmit data. The NIC may include an active state. In the active state, the NIC may be capable of connecting to a communication channel or transmitting data. The microprocessor may toggle the NIC from the inactive state to the active state. The microprocessor may toggle the NIC from the active state to the inactive state.

For example, the microprocessor may detect that a valid PIN has been spoken by the user into the speaker, and that the voice of the speaker identifies a user of the smart card. In response, the microprocessor may toggle the NIC and the NFC chip from the inactive to the active state. In response to receiving an invalid PIN, the microprocessor may maintain the NIC in the inactive state. In some embodiments, if the microprocessor detects a threshold number of invalid PIN entries, the microprocessor may lock the NIC.

The microprocessor may require a special code to unlock the NIC. The microprocessor may require that the smart card establish a wired connection to unlock the NIC. For example, the NIC may only be unlocked when the smart card is inserted into a card reader of an ATM. The smart card may also require entry of a valid PIN to access the ATM before unlocking the NIC.

The smart card may include a biometric reader. The microprocessor may require submission of a valid biometric feature before attempting to establish a communication channel with the secure transaction gateway. The microprocessor may require submission of a valid biometric feature before submitting the transaction instructions to the secure transaction gateway.

The smart card may include an electrical contact. The battery may be rechargeable. The batter may be recharged via the electrical contact when the smart card is inserted into an Automated Teller Machine ("ATM") and/or a Point of Sale device ("POS"). The electrical contact may be constructed using any suitable material that conducts or transfers electricity. The smart card may include a plurality of electrical contacts. The electrical contact(s) may be accessible on any suitable face of a housing of the smart card. The contact(s) may be utilized to transfer electrical charge to the rechargeable battery when the smart card is inserted into a card reader of the ATM and/or the POS.

In some embodiments, the smart card's power source may include high frequency signals received from an ATM, POS or other network node. The smart card may be configured to utilize received high frequency signals to recharge the battery or provide power to other hardware components of the smart card. The high frequency signals may conform to a standardized NFC communication standard.

The smart card may include a housing. The housing may have the form factor of the smart card of 85.60 mm×53.98 mm×0.8 mm. The apparatus included in the smart card, detailed herein, may not exceed the form factor. The NIC may be embedded in the housing. The microprocessor and the NFC chip may be embedded within a thickness of the housing. The housing may enclose the battery for powering the NIC and the microprocessor. The housing may include the electrical contact(s), the activation button, the voice controller and, in some embodiments, the keypad and/or the biometric reader.

The housing and the apparatus embedded within and on the housing, collectively, may have a thickness that is not greater than 0.8 mm and a surface area that is not greater than 86 mm×54 mm. Such a compact form factor may allow the smart card to be inserted into traditional card readers and function as a typical debit or credit card.

For example, the user may use the smart card to access an ATM and withdraw cash. The user may also use the smart card to make a purchase at a traditional brick and mortar location. The user may pay for such a purchase using a conventional point-of-sale ("POS") terminal at the brick and mortar location. When the smart card is inserted into card reader of an ATM or POS terminal a battery of the smart card may be recharged.

The memory of the smart card may include non-transitory memory and/or other storage media. Software may be stored within the non-transitory memory and/or other storage media. Software may provide instructions, that when executed by the microprocessor, enable the smart card to perform various functions. For example, software may include an operating system, programs and a database. Alternatively, some or all of computer executable instructions of the smart card may be embodied in hardware or firmware components of the smart card.

Application programs, which may be used by the smart card, may include computer executable instructions for invoking user functionality related to communication, authentication services, voice input, NLP, and speech recognition applications. Application programs may utilize one or more algorithms that encrypt information, process received executable instructions, interact with an issuer or acquirer bank systems, perform power management routines or other suitable tasks.

The smart card may operate in a networked environment. The smart card, via the NIC, may support establishing communication channels with one or more issuer or acquirer bank systems. The smart card may connect to a local area network ("LAN"), a wide area network ("WAN") a cellular network or any suitable communication network. When used in a LAN networking environment, the smart card may be connected to the LAN through a network interface or adapter. The NIC may include the network interface or adapter.

When used in a WAN networking environment, the NIC may include a modem or other means for establishing communications over a WAN, such as the Internet. The NIC may include the modem. It will be appreciated that the existence of any of various well-known protocols such as TCP/IP, Ethernet, FTP, HTTP and the like is presumed.

The smart card may be operational with, and apparatus and methods described herein may be incorporated into, other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by the microprocessor. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The microprocessor may be configured to control overall operation of the smart card and its associated components. The smart card may include executable instructions stored in a non-transitory memory. The memory may include the non-transitory memory. The executable instructions, when run by the microprocessor, may configure the microprocessor to take actions or control operation of one or more components of the smart card. The executable instructions, when run by the microprocessor, may formulate transaction instructions. The microprocessor may encrypt the transaction instructions. Other components of the smart card herein may also include non-transitory memory having one or more of the functions detailed herein.

The microprocessor may activate the NIC. The microprocessor may active the wireless interface of the NIC. Using the wireless interface, the microprocessor may establish a communication link with a secure system via a transaction gateway. The secure system may be a payment network and/or a transaction platform. A network address of the secure system may be stored on the smart card. For example, the network address of the secure system may be stored in firmware of the smart card's NIC. The network address may identify an address of a financial institution. The financial institution may be the issuer of the smart card.

The wireless interface may communicate with the transaction gateway using a communication protocol. Communication with the transaction gateway may be encrypted using an encryption algorithm. The smart card may transmit transaction instructions that include sensitive transaction information directly to the secure system via the transaction gateway for processing.

The executable instructions, when run by the microprocessor, may authenticate the smart card to the secure system over the transaction gateway. The microprocessor may transmit the encrypted transaction instructions to the transaction gateway. The secure system may then process the transaction instructions received from the smart card via the transaction gateway.

Processing the transaction instructions may include debiting an account of the user of the smart card user by a transaction amount specified by the user. After debiting the user account, the secure system may provide confirmation to the smart card over the transaction gateway.

The secure system may be operated by an issuer of the smart card. The secure system may debit an account of the user of the smart card for the transfer of the funds and send the funds to a destination specified by the user.

The smart card may receive confirmation from the secure system that the transaction instructions have been successfully executed. For example, the secure system may communicate to the smart card via the wireless interface that the transaction instructions generated by the smart card have been successfully executed.

The smart card may store sensitive transaction information. The smart card may insulate sensitive transaction information stored on the smart card from exposure to unsecure systems. Sensitive transaction information, as used herein, may include one or more of a user bank account number such as a Primary Account Number ("PAN"), User name, User Address, User Telephone number, Expiration date, Service code, Authentication data, Personal Identification Number ("PIN"), PIN Block, and/or Card validation value (CVV), or any other three/four-digit card security code The PAN may be a multi-digit number printed on a front face of the smart card. The PAN may identify an issuer bank associated with the smart card. The smart card may correlate the specified issuer to the network address. The PAN may identify the user account at the issuer bank.

The PIN associated with the smart card may be a secret numeric password known to the user of the smart card. The PIN may be used to authenticate the user before providing access to the secure system. A user may only be granted access to the secure system if the provided PIN matches a PIN stored on the secure system or on the smart card. For example, a PIN may be used to authenticate the smart card at an ATM. A PIN may also be used to authorize a digital signature implemented by an EMV chip.

A PIN Block may include data used to encapsulate a PIN during processing and transmission of the PIN. The PIN block may define the location of the PIN within the PIN block and how it can be extracted from the PIN block. A typical PIN block includes the PIN, the PIN length, and may contain subset of the PAN.

Apparatus and methods for the smart card are provided. The smart card may be responsive to voice commands. The smart card may support electronic communication with the payment network. The smart card may have a thickness not greater than 0.8 mm and a surface area not greater than 86 mm×54 mm.

The smart card may include the housing. The smart card may include the NIC embedded in the housing. The NIC may include the wireless communication interface. The smart card may include the voice controller. The voice controller may include the sound card, the microphone and the speaker. The smart card may include the active NFC chip. The smart card may include the microprocessor. The microprocessor may be embedded in the housing. The microprocessor may be in electronic communication with the NIC, the voice controller and the NFC chip. The smart card may include the battery. The battery may be embedded in the housing. The battery may power the NIC, the microprocessor, the voice controller and the NFC. The battery may power the active NFC chip with no more than 40 mA of power.

The smart card may include the activation button. The activation button may be depressible. The activation button may be activated by depression of the activation button.

The smart card may include the executable instructions stored in the non-transitory memory, that when run by the microprocessor, activate the voice controller in response to activation of the activation button. Via the voice controller, the smart card may detect and capture a first audio message.

The smart card may perform speaker-dependent speech recognition on the captured audio message. The speech recognition may include comparing segments of the first audio message to pre-saved captured sound stored locally in the memory.

When the speech recognition determines that the first audio message was generated by a user of the smart card, the smart card may use natural language processing to convert the first audio message into machine readable transaction data comprising a transaction amount. In some embodiments, the data may also include a PIN number.

In some embodiments, the smart card may include a biometric reader. The executable instructions stored in the non-transitory memory, when run by the microprocessor, may require a capturing, using the biometric reader, of a valid biometric feature before submitting the transaction instructions to the secure transaction gateway. The valid biometric feature may be stored on the smart card. The valid biometric feature may be transmitted to the secure system via the NIC for validation.

In some embodiments, the smart card may include a keypad. The keypad may be configured to receive numerical input from the user. The numerical input may include the PIN.

In embodiments when the user inputs a PIN into the smart card by voice or the keypad, the PIN may be validated by the smart card prior to continuing to process the audio message. Entry of an invalid PIN may terminate the process.

The smart card may generate, using the NFC chip, a radio-frequency field for requesting, from a target device including an active or passive NFC chip, transferee bank account information. The radio-frequency field may include sufficient power to power a passive NFC chip.

The smart card may receive from the target device, using the NFC chip, the transferee bank account information. Using the microprocessor, the smart card may formulate a set of transaction instructions. The transaction instructions may include a bank account number associated with the smart card, the transaction amount and the transferee bank account information.

The executable instructions stored in the non-transitory memory, when run by the microprocessor, may encrypt the transaction instructions such that the transaction instructions are decryptable by the secure system.

Using the wireless interface, the smart card may establish a direct communication channel with a secure transaction gateway using a network address stored locally in the memory. The network address may be stored in the non-transitory memory is associated with an issuer of the smart card.

Using the wireless interface, the smart card may transmit to the network address the transaction instructions. In some embodiments, the wireless interface may not transmit the encrypted transaction instructions to the transaction gateway until capturing a third audio message, by the voice controller, that, which analyzed by the speech recognition and NLP, includes an authorization, from the user, to initiate the transaction.

In response to receiving confirmation from the secure system, via the transaction gateway, that the transaction instructions have been successfully executed, the smart card may generate, using the voice controller, a second audio message confirming approval of the transaction instructions.

The smart card may include least one electrical contact accessible through the housing. The battery may be configured to be recharged via the at least one electrical contact when the smart card is inserted into a card reader.

In some embodiments, the voice controller may include an inactive state and an active state. In the inactive state, the voice controller may be unable to capture audio messages. In the active state, the voice controller may be capable of capturing audio messages. The microprocessor may toggle the voice controller from the inactive state to the active state in response to activation of the activation button.

In some embodiments, when the voice controller is in the inactive state, the wireless interface may be unable to transmit data. When the voice controller is in the active state, the wireless interface may be capable of transmitting data.

When the speech recognition determines that the first audio message was not generated by a user of the smart card, the microprocessor may terminate analysis of the first audio message. Additionally, the microprocessor may maintain the wireless interface in a state in which the wireless interface is unable to transmit data.

Thus, the smart card may enable peer-to-peer transactions by establishing a direct communication channel with the secure transaction gateway independent of a POS device, thereby providing for POS device-independent transaction initiation.

Apparatus and methods for the smart card are provided. The smart card may be responsive to voice commands. The smart card may support electronic communication with the payment network. The smart card may have a thickness not greater than 0.8 mm and a surface area not greater than 86 mm×54 mm.

The smart card may include the housing. The smart card may include the NIC embedded in the housing. The NIC may include the wireless communication interface. The smart card may include the voice controller. The voice controller may include the sound card, the microphone and the speaker. The smart card may include the active NFC chip. The smart card may include the microprocessor. The microprocessor may be embedded in the housing. The microprocessor may be in electronic communication with the NIC, the voice controller and the NFC chip. The smart card may include the battery. The battery may be embedded in the housing. The battery may power the NIC, the microprocessor, the voice controller and the NFC. The smart card may include the activation button.

The smart card may include the executable instructions stored in the smart card's non-transitory memory, that when run by the microprocessor, activate the voice controller in response to activation of the activation button. The smart card, via the voice controller, may detect and capture a first audio message.

The smart card may perform speaker-dependent speech recognition on the captured audio message. The speech recognition may include comparing segments of the first audio message to pre-saved captured sound stored locally in the memory.

When the speech recognition determines that the first audio message was generated by a user of the smart card, the smart card may use natural language processing to convert the first audio message into machine readable transaction data comprising a transaction amount and recipient data. The recipient data may be a name. The recipient data may be an alphanumeric string.

Using the microprocessor, the smart card may formulate a set of transaction instructions. The set of transaction instructions may include the transaction amount, the recipient data, and smart card identifying data. The smart card identifying data may include a bank account number associated with the smart card, a routing number, and any other suitable smart card data detailed herein.

Using the wireless interface, the smart card may establish a direct communication channel with the secure transaction gateway using a network address stored locally in the memory. Using the wireless interface, the smart card may transmit to the network address the transaction instructions. In response to receiving confirmation from the secure transaction gateway, via the communication channel, that the transaction instructions have been successfully executed, the smart card may generate, using the voice controller, a second audio message confirming approval of the transaction instructions.

Thus, the smart card may support autonomous smart card transaction initiation by generating transaction instructions over the secure network without receiving input identifying a recipient from a device different from the smart card.

Apparatus and methods for a smart card are provided. The apparatus may include a system for supporting autonomous smart card transactions.

The system may include the smart card. The smart card may be responsive to voice commands. The smart card may support electronic communication with a transaction platform. The smart card may have a thickness not greater than 0.8 mm and a surface area not greater than 86 mm×54 mm.

The smart card may include the housing. The smart card may include the NIC embedded in the housing. The NIC may include the wireless communication interface. The smart card may include the voice controller. The voice controller may include the sound card, the microphone and the speaker. The smart card may include the active NFC chip. The smart card may include the microprocessor. The microprocessor may be embedded in the housing. The microprocessor may be in electronic communication with the NIC, the voice controller and the NFC chip. The smart card may include the battery. The battery may be embedded in the housing. The battery may power the NIC, the microprocessor, the voice controller and the NFC. The smart card may include the activation button. The smart card may include the executable instructions stored in the smart card's non-transitory memory.

The apparatus may include the transaction platform. The transaction platform may support communications over the transaction gateway. The transaction platform may be associated with the network address.

The executable instructions stored in the memory of the smart card, when run by the microprocessor on the smart card, may activate the voice controller in response to activation of the activation button and, via the voice controller, detect and capture a first audio message.

Using the microprocessor, the smart card may formulate a transaction communication. The transaction communication may include the first audio message and smart card identifying data. Using the wireless interface, the smart card may establish a direct communication channel with the secure transaction gateway using the network address. The network address may be stored locally in the memory of the smart card. Using the wireless interface, the smart card may transmit to the network address the transaction communication.

The transaction platform may be configured to receive the transaction communication. The transaction platform may use the smart card identifying data to identify a user account linked to the smart card.

The transaction platform may perform speaker-dependent speech recognition on the captured audio message. The speech recognition may include comparing segments of the first audio message to pre-saved captured sound associated with a user of the smart card and accessible to the transaction platform.

When the speech recognition determines that the first audio message was generated by the user of the smart card, the transaction platform may use natural language processing to convert the first audio message into machine readable transaction data comprising a transaction amount and recipient data. The recipient data may be a name, such as 'John' or 'John Smith.' The recipient data may be an alphanumeric string, such as 13572, A5E4U, etc.

The transaction platform may correlate the recipient data with stored recipient data associated with the user account. The stored recipient data may include a recipient account. For example, the authorized user may have saved data in his banking platform associated 'John Smith' with bank account number '13683429387' and, in some embodiments, a routing number.

The transaction platform may confirm that sufficient funds are in the user account to cover the transaction amount. After the confirmation, the transaction platform may initiate a transfer of funds equal to the transaction amount from the user account to the recipient account. The transaction platform may then transmit to the smart card, via the secure transaction network, a confirmation that instructions included in the first audio message have been fulfilled.

In response to receiving the confirmation from the transaction platform, the smart card may generate, using the voice controller, a second audio message confirming approval of the transaction instructions.

When the speech recognition of the transaction platform determines that the audio message was not generated by the user of the smart card, the transaction platform may transmit a warning message to the smart card. If the transaction platform is unable to initiate the transfer of funds because recipient data could not be retrieved, insufficient funds were in the account, or for any other reason, the transaction platform may send a message, to the smart card, stating that the transaction could not be executed.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes housing 102. Housing 102 may enclose a microprocessor and other components for capturing, encrypting and storing information entered by a user, such as one or more of the components described above. Smart card 100 may also include executable instructions for packaging information entered via voice controller 117 and, in some embodiments, keypad 105, into transaction instructions that may be transferred to the transaction gateway. The executable instructions may also formulate the transaction instructions based on sensitive transaction information stored on the smart card detailed herein.

Smart card 100 may include chip 101. Chip 101 may provide an electrical contact that is accessible through housing 102. Chip 101 may provide an electrical contact for establishing a wired or contact based communication channel with an ATM or POS terminal when card 100 is inserted into a card reader of the ATM or POS terminal. Chip 101 may be an EMV chip.

Chip 101 may store a copy of information printed on a face of smart card 100. For example, chip 101 may store PAN 109, user name 115, expiration date 113 and issuing bank 111. Chip 101 may also store encrypted security information. The encrypted security information may be utilized to provide a "second factor" method of authentication prior to triggering execution of transaction instructions.

For example, smart card 100 may package information entered by user 115 via voice controller 117 and/or keypad 105 into transaction instructions. The transaction instructions may include a PIN associated with smart card 100. The transaction instructions may include a transaction amount and, in some embodiments, a recipient of the transaction amount. The transaction instructions may be submitted for execution to a secure system without requiring any further input from user 115. The transaction instructions may be transferred to the secure system using wireless circuitry 103. Wireless circuitry may include the NIC. In some embodiments, the transaction instructions may be transferred via wired communication with chip 101.

The secure system, or the smart card, may receive an audio message captured by the voice controller. The secure system, or the smart card, may determine if the audio message was generated by a user of the smart card. The secure system, or the smart card, may use speech-dependent voice recognition software to determine if user 115 generated the audio message. If user 115 is determined to have generated the audio message, an input of a PIN may not be required to process a transaction. In some embodiments, a PIN may be required to be input, by user 115, to process user 115's verbal transaction request. The PIN may be input into keypad 105, or, alternately, transmitted to smart card 100 via speech.

In some embodiments when a PIN is required for user authentication, the secure system may receive transaction instructions formulated by smart card 100, the transaction instructions including a PIN. The secure system may verify that the PIN included in the transaction instructions is associated with smart card 100. For example, the secure system may determine whether the received PIN is associated with user name 115 and/or PAN 109. Alternately, the method steps may be performed by the smart card.

As a second factor method of authentication, the secure system may determine whether the PIN included in the transaction instructions successfully unlocks encrypted security information stored on chip 101. If the PIN successfully unlocks the encrypted security information, the secure system may execute the received transaction instructions. Alternately, the method steps may be performed by the smart card.

Smart card 100 may include keypad 105. Keypad 105 may be used by a user of smart card 100 to enter information. Keypad 105 may include braille on top of each number and command. Keypad 105 may include display 107. Display 107 may be used by smart card 100 to display messages to user 115.

Smart card 100 may include actuation button 119. Actuation button 119, when depressed, may actuate voice controller 117. Actuation of voice controller 117 may initiate voice controller 117 to begin processing audio messages.

Smart card 100 may have a length l of 85.60 mm. Smart card 100 may have a width w of 53.98 mm.

Figure 2:
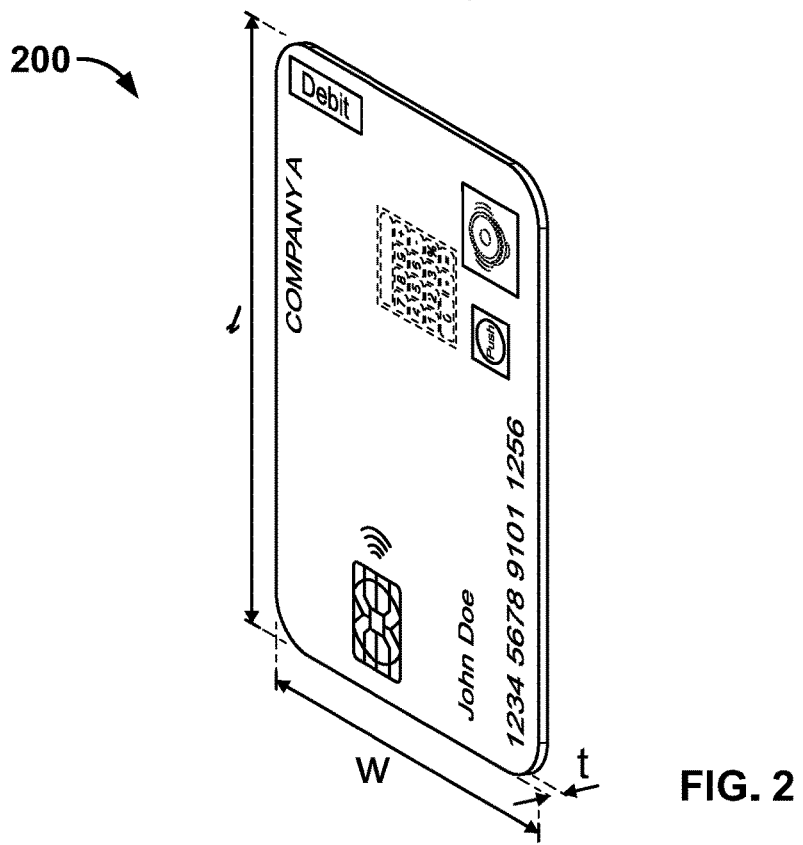
FIG. 2 shows illustrative apparatus in accordance with principles of the disclosure.

FIG. 2 shows that illustrative smart card 200 may be any suitable size. Smart card 200 may have one or more features in common with smart card 100.

FIG. 2 shows that smart card 200 has width w, length l and thickness t. For example, width w may be 53.98 mm. Length l may be 85.60 mm. Thickness t may be 0.8 mm. An exemplary form factor of smart card 200 may be 53.98 mm×85.60 mm×0.8 mm. Such an exemplary form factor may allow smart card 200 to conveniently fit into a user's wallet or pocket. This exemplary form factor may allow smart card 200 to fit into a card reader of an ATM or POS terminal. Smart card 200 may have any other suitable measurement for width w, length l and thickness t.

Figure 3A:
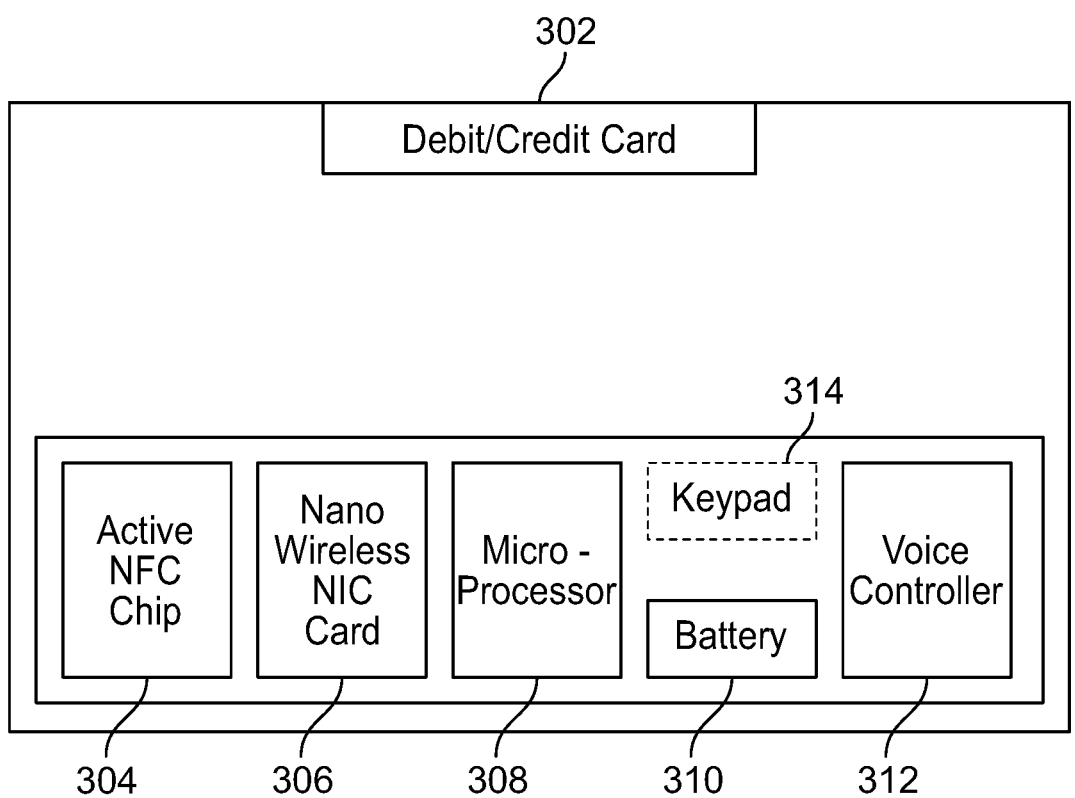
FIG. 3A shows illustrative apparatus in accordance with principles of the disclosure.

FIG. 3A shows illustrative architecture of smart card 302. Smart card 302 may have one or more features in common with smart card 100 and/or smart card 200. Smart card 302 may include embedded active NFC chip 304. Smart card 302 may be configured to directly communicate with a second smart card. Active NFC chip 304 may enable smart card 302 to communicate with a second smart card using NFC. The second smart card may include an active NFC chip. The second smart card may include a passive NFC chip. Active NFC chip 304 may be configured to send out an RF field with sufficient power to power a passive NFC chip of a second smart card to enable the second smart card to communicate with smart card 302.

Smart card 302 may include nano wireless NIC 306 and microprocessor 308. Smart card 302 may include battery 310. Smart card 302 may include voice controller 312. Smart card 302 may, in some embodiments, include keypad 312.

Figure 3B:
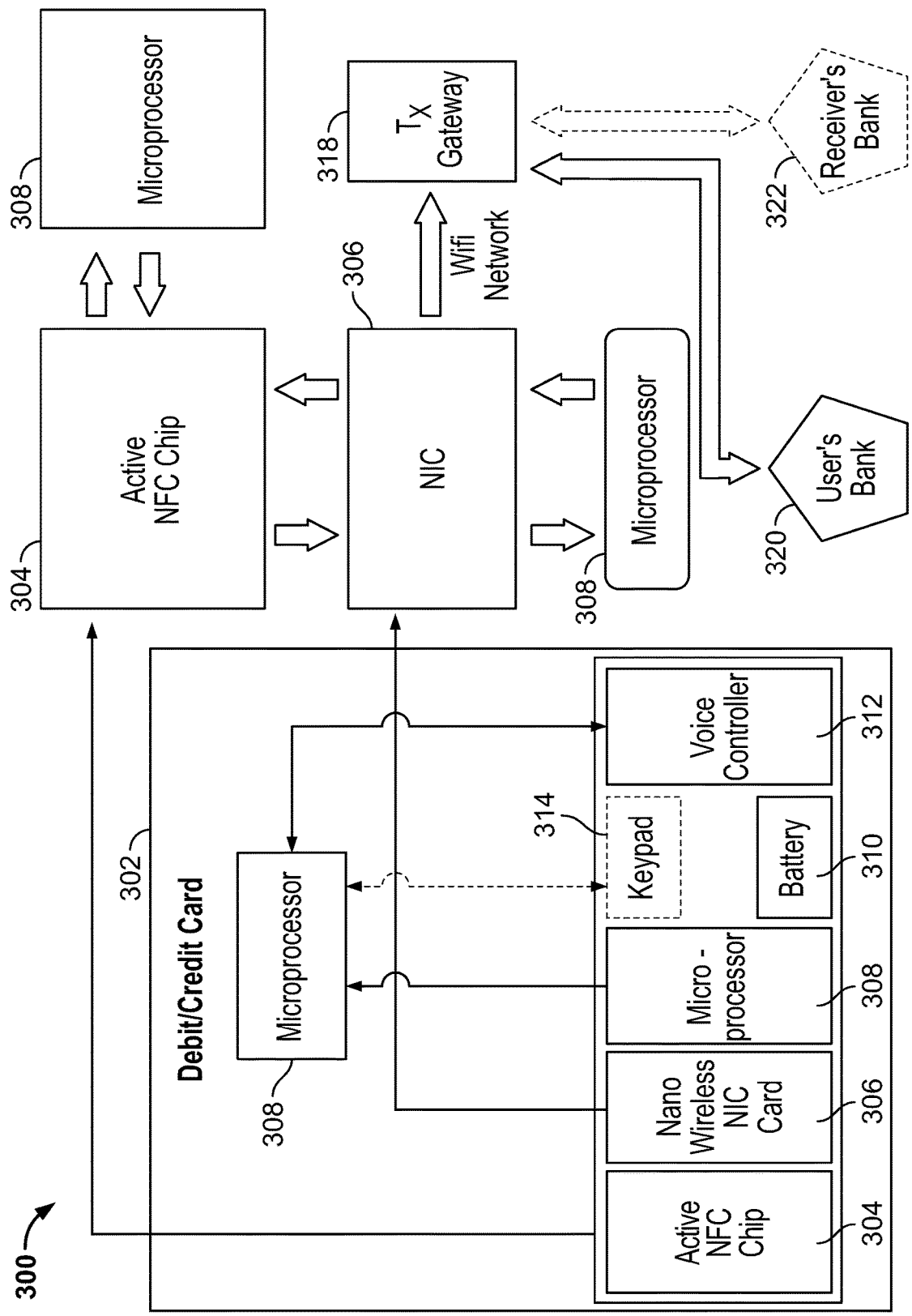
FIG. 3B shows illustrative apparatus and methods in accordance with principles of the disclosure.

FIG. 3B shows illustrative system architecture 300. System architecture 300 includes smart card 302. In FIG. 3B, NFC chip 304, NIC 306, voice controller 312 and keypad 314 are shown be in electronic communication with microprocessor 308. NFC chip 304 is in electronic communication with NIC 306.

Smart card 302 may connect to a Wi-Fi network via NIC 306. NIC 306 is shown, in FIG. 3B, to be in electronic communication, over a WiFi network with Transaction Gateway 318. Thus, smart card 302 may utilize NIC 306 to establish electronic communication with a transaction gateway.

Transaction gateway 318 may be in electronic communication with User's Bank 320. User's bank 320 may be a bank that issued smart card 302. In some embodiments, transaction gateway 318 may also be in electronic communication with Receiver's Bank 322. Receiver's Bank 322 may be a bank of a designated recipient of funds being transferred from smart card 302.

In some embodiments, transaction gateway 318 may represent a secure transaction gateway that is used by the smart card to establish a direct communication channel with a network address stored locally in the memory.

User's bank 320 may determine whether smart card 302 is associated with sufficient funds to process a transaction request of a user of smart card 302. User's bank 320 may perform one or more checks to verify transaction instructions received from smart card 302. For example, User's bank 320 may prompt a user of smart card 302 to speak into voice controller 312 and/or to enter a PIN into keypad 314.

Microprocessor 308 may formulate transaction instructions destined for User's Bank 320. Such transaction instructions may be forwarded to User's Bank 320 by transaction gateway 318. In some embodiments, smart card 302 may be configured to directly communicate with User's Bank 320. For example, User's Bank 320 may request authentication, such as a PIN, before proceeding to debit an account associated with smart card 302 based on received transaction instructions. In some embodiments, after a successful execution of transaction instructions, smart card 302 may receive confirmation from User's Bank 320.

Figure 4:
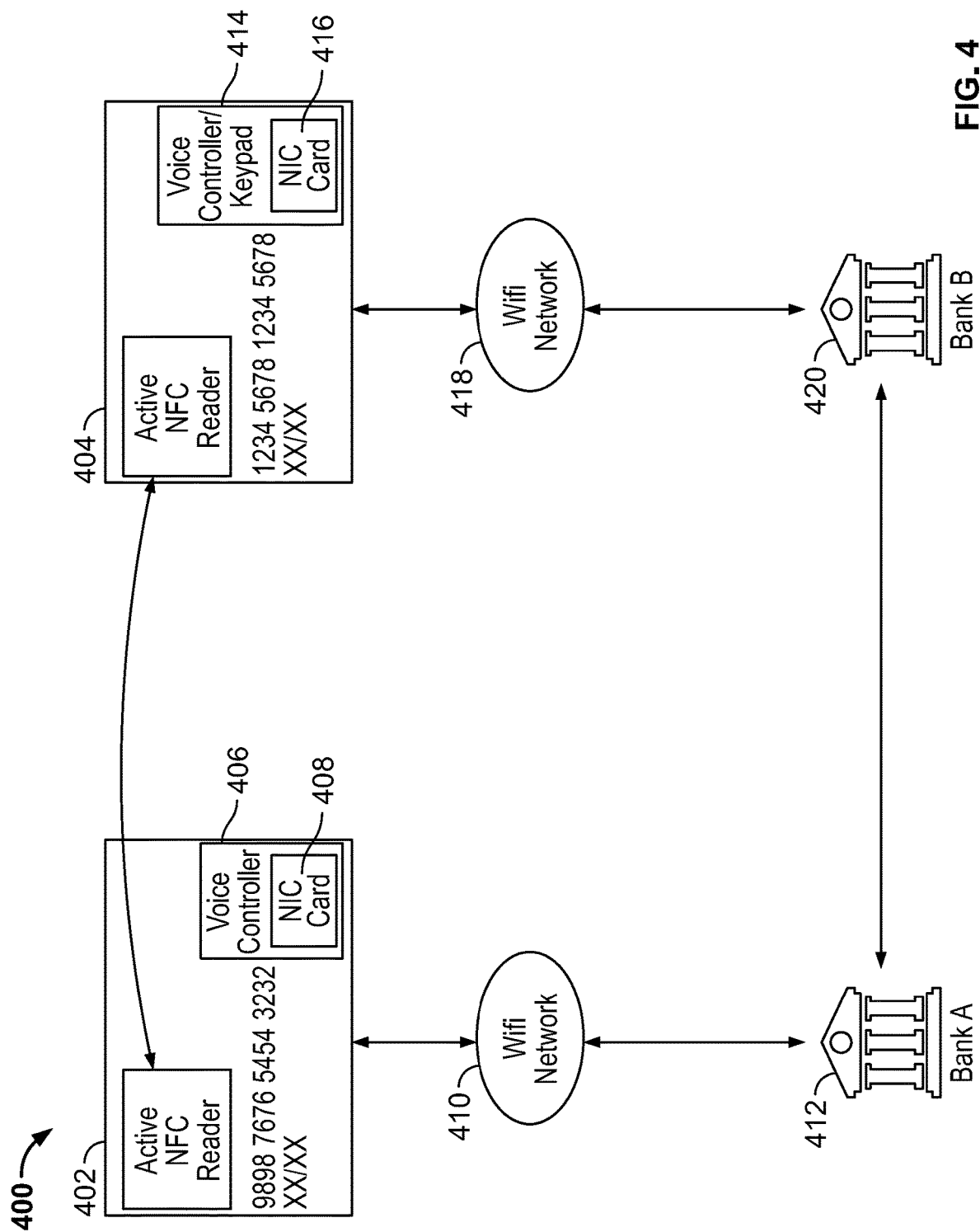
FIG. 4 shows illustrative apparatus and methods in accordance with principles of the disclosure.

FIG. 4 shows an illustrative diagram 400 of smart card 402 directly communicating with smart card 404 to complete a transaction. Card 402 may be the initiator and card 404 may be the target. Card 404 may be the initiator and card 402 may be the target.

Card 402 may include voice controller 406, NIC card 408, and one or more features of the smart cards described herein and illustrated in the figures. Card 404 may include voice controller and/or keypad 414, NIC card 416, and one or more features of the smart cards described herein and illustrated in the features. The NIC embedded in each of Cards 402 and 404 may enable the cards to connect to a payment network using nearby WI-FI networks 410 and 418.

Each of cards 402 and 404 may require receipt of a PIN to activate the card to communicate with the other card and perform a transaction. Card 402 may require receipt of an audio message that, when analyzed, includes the PIN. Card 404 may require one, or both, of receipt of an audio message including the PIN and input of the PIN into the keypad. In some embodiments, correlating the voice of the speaker with a user of the smart card may be sufficient to activate one card to communicate with the other card to perform a transaction.

When activated, the cards may be enabled to communicate with each other using the active NFC reader embedded in the cards. Card data may be exchanged between cards 402 and 404 using the active NFC readers.

When card 402 is the initiator, card 402 may complete the transaction through a transaction network over Wifi network 412. The transaction network may include Bank A 412. Bank A 412 may be an issuer of smart card 402.

When card 404 is the initiator, card 404 may complete the transaction through a transaction network over Wifi 418. The transaction network may include Bank B 420. Bank B 412 may be an issuer of smart card 404.

Figure 5:
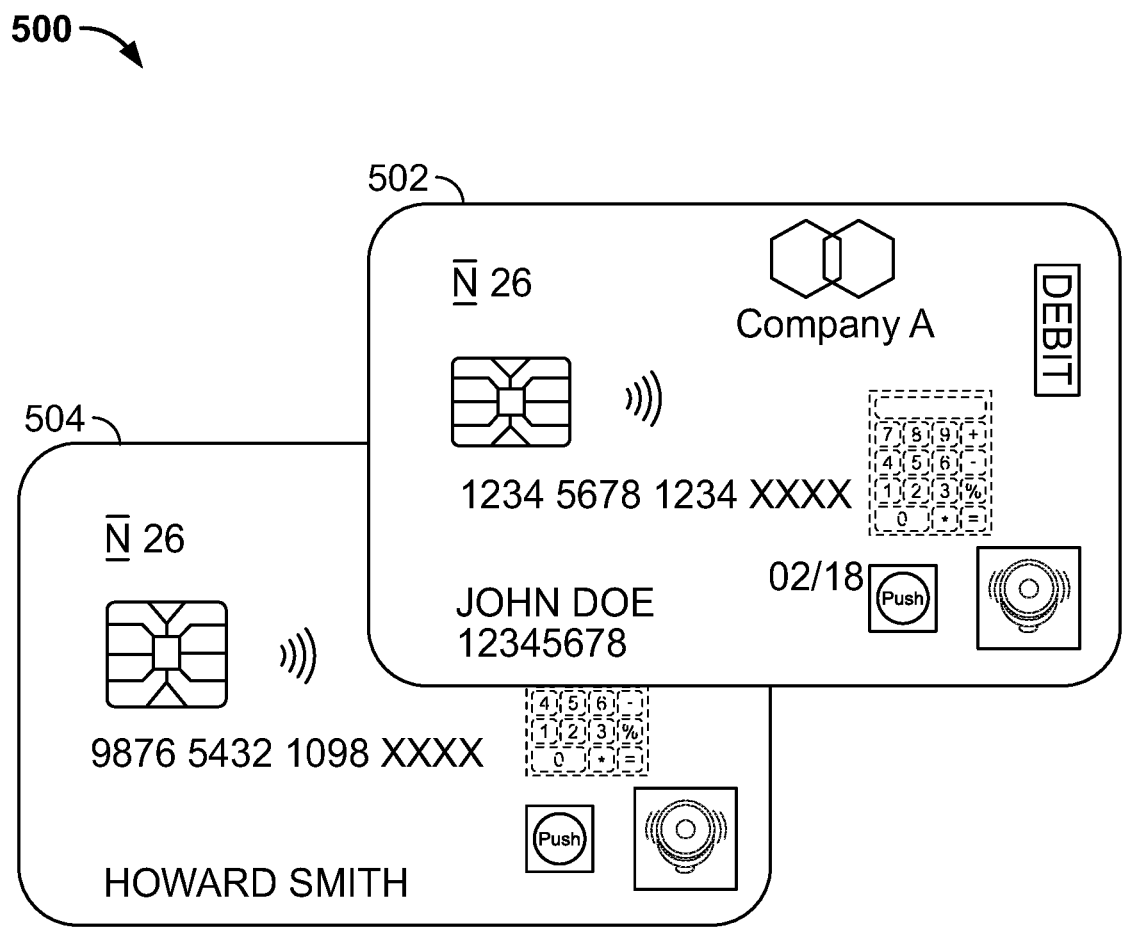
FIG. 5 shows illustrative apparatus in accordance with principles of the disclosure.

FIG. 5 shows an exemplary diagram 500 of smart card 502 and smart card 504 in close proximity to each other. Smart cards 502 and 504 may be directly communicating with one another. One or both of smart cards 502 and 504 may include active NFC chips. The active NFC chip(s) may enable smart cards 502 and 504 to exchange information and complete a contactless transaction independent of a POS device. Thus, direct communication between smart cards 502 and 504 may be independent of any intermediary device.

Smart card 502 may have one or more features in common with the smart card described herein and illustrated in the figures. Smart card 504 may have one or more features in common with the smart card described herein and illustrated in the figures.

Smart card 502 may be a debit card and, in some embodiments, also function as a credit card. Smart card 504 may be a debit card and, in some embodiments, also function as a credit card.

Figure 6:
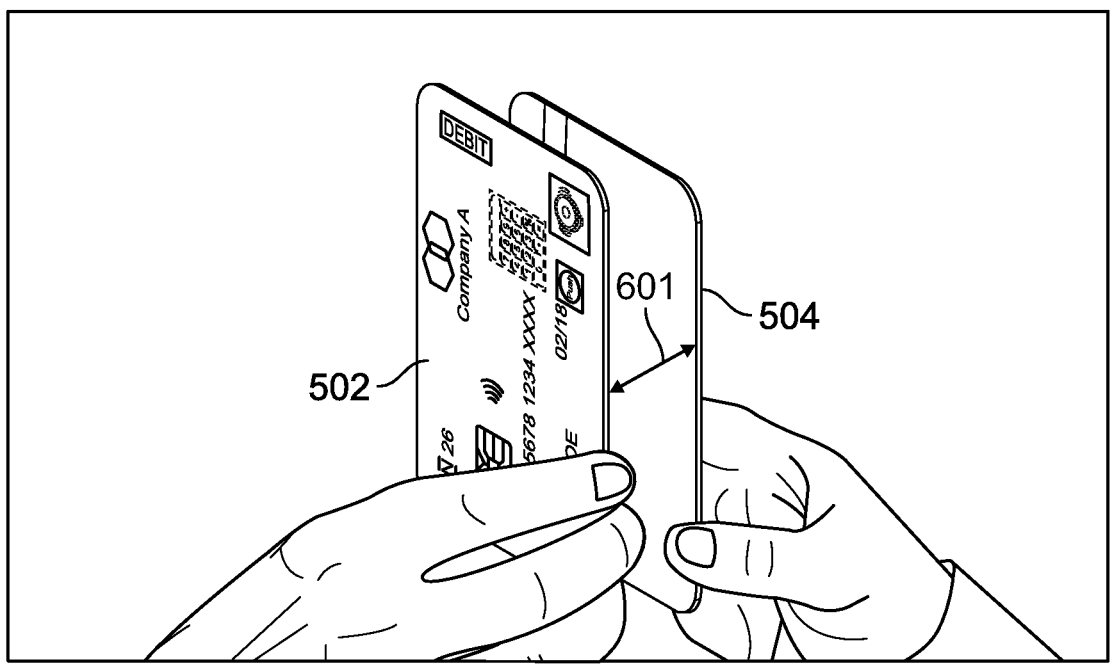
FIG. 6 shows an illustrative scenario in accordance with principles of the disclosure.

FIG. 6 shows illustrative card-to-card direct communication. In FIG. 6, smart card 502 has been placed in adjacent to smart card 504.

To perform a transaction between smart card 502 and smart card 504, and enable two-way communication between smart card 502 and 504, smart cards 502 and 504 must be positioned such that a distance 601 between the cards is sufficient to support NFC communication. For example, distance 601 may range between zero and up to approximately 20 cm to support NFC communications. It should be appreciated that any other exemplary NFC communication range may be supported by the NFC chips, such as a range of 0-5 cm, 0-10 cm, 0-15 cm, or a range of greater than 20 cm.

Figure 7:
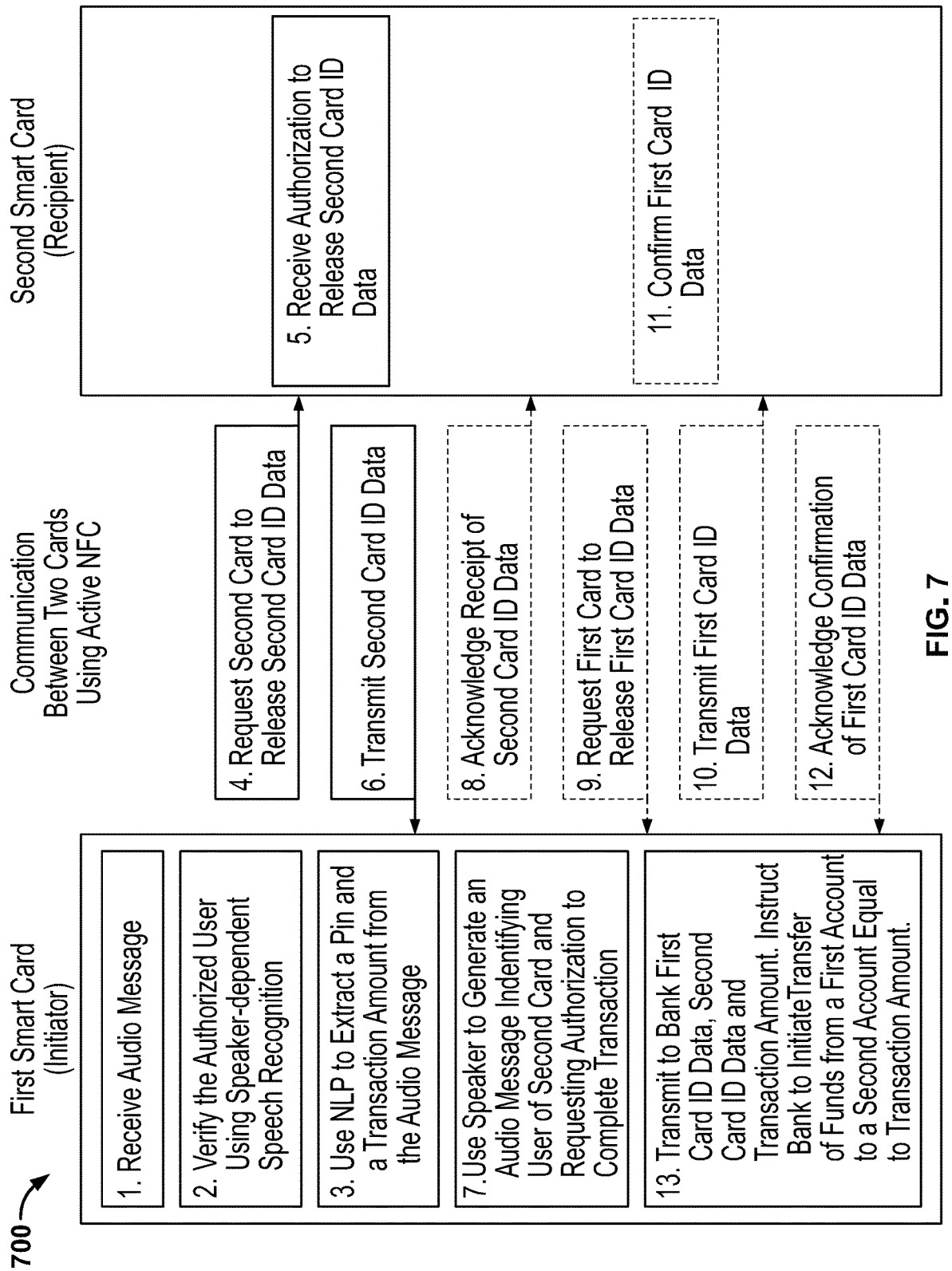
FIG. 7 shows an illustrative method in accordance with principles of the disclosure.

FIG. 7 shows an illustrative method. Methods may include some or all of method steps 1-11. Methods may include the steps illustrated in FIG. 7 performed in an order different from the illustrated order. Methods may include additional steps not shown but described herein.

At step 1, a first smart card may receive an audio message. The voice controller of the first smart card may receive the audio message.

At step 2, a microprocessor of the first smart card may verify an authorized user of the smart card using speaker-dependent speech recognition. The smart card may have one, two, three or more authorized users.

In some embodiments, the verification may include comparing segments of the first audio message to pre-saved captured sound stored locally in the memory. The authorized user may be verified when the pre-saved captured sound and the audio message have one, two, three or more speech characteristics in common, such as enunciation, tempo, speed, and/or any other suitable characteristics. When the smart card has two or more authorized users, the verification may include comparing the audio message to two or more groups of pre-saved captured sound. Each group of captured sound may have been generated by one of the authorized users.

In some embodiments, the verification may include sending the audio message, using a NIC of the smart card, to a network address via a wireless connection. The network address may be a network address associated with an issuer of the smart card. The verification may include receiving, via the wireless connection, a message confirming, or denying, that the audio message was generated by an authorized user. In some of these embodiments, the smart card may not store locally pre-saved captured sound.

The process may be terminated if the audio message is determined not to have been generated by an authorized user of the smart card.

At step 3, the microprocessor may use natural language processing to extract a PIN and a transaction amount from the audio message. The microprocessor may verify that the PIN corresponds to a pre-saved PIN stored locally on the smart card. In some embodiments, the NIC may transmit the PIN to the network address via the wireless connection to verify the PIN. A message may subsequently be received, over the wireless connection, confirming or rejecting the veracity of the PIN.

The process may be terminated if the PIN is determined to be inaccurate.

At step 4, the first smart card may request a second smart card to transmit second card ID data to the first smart card. At step 5, the second smart card may receive authorization from a user of the second smart card to release the second card ID data. The authorization may be received in the form of a depression of a button, the entering of a PIN in a keypad, and/or receipt of an audio message, by the second smart card, that is determined, by the smart card, to the originate from an authorized user of the second smart card and includes authorization instructions to transmit the data.

At step 6, the second smart card may transmit the second card ID data to the first smart card. At step 7, the first smart card may generate, using the voice controller of the first smart card, an audio message identifying a user of the second smart card and requesting authorization, from the authorized user of the first smart card, to complete the transaction. Authorization to complete the transaction may include an audio message from the authorized user, captured by the voice controller. Authorization to complete the transaction may include actuation of the actuation button. Authorization to complete the transaction may include input of one or more keypresses on a first smart card keypad.

When authorization is received, at step 13, the first smart card may transmit data to a bank that has issued the first smart card via the first smart card's NIC. The data may include first card ID data, the second card ID data, and the transaction amount. The data may also include an instruction to the bank to initiate a transfer of funds from a first account to a second account equal to the transaction amount.

First card ID data may include a bank account number associated with the first smart card, a routing number, an authorized first card user name, and any other suitable data associated with the first smart card. Second card ID data may include a bank account number associated with the second smart card, a routing number, an authorized second card user name, and any other suitable data associated with the second smart card.

The first account may be a bank account associated with the first smart card. The second account may be a bank account associated with the second smart card.

Options steps 8-12 may be performed after step 7 and before step 13. Optional steps 8-12 include a 'handshake' between the first smart card and the second smart card. At step 8, the first smart card may transmit a message to the second smart card, acknowledging receipt of the second card ID data. In response, at step 9, the second smart card may request the first card to release first card ID data. At step 10, the first smart card may transmit first card ID data to the second smart card. At step 11, the second smart card may confirm the first card ID data. The confirmation may include confirming that the identify of the authorized user of the first card is an individual who the second smart card user expects the authorized user to be. This may ensure that the transaction is executed without the second smart card user being subjected to fraud. In some embodiments, steps 8-12 may be executed prior to the second smart card transmitting the second smart card ID to the first smart card. This may ensure that the user of the second smart card does not release his personal data without verifying the true identity of the recipient of his data. If the first card ID data identifies a user that the second card user does not recognize, the process may be terminated.

If the second card user is comfortable with the first card ID data, the second card user may confirm the first card ID data. This may include the second smart card receiving input, from the second card user, confirming the first card ID data. At step 12, the second smart card may transmit a message to the first smart card, acknowledging confirmation of the first card ID data. In some embodiments, the first card may not execute steps 13 without receipt of a message, from the second card, acknowledging confirmation of the first card ID data.

Figure 8:
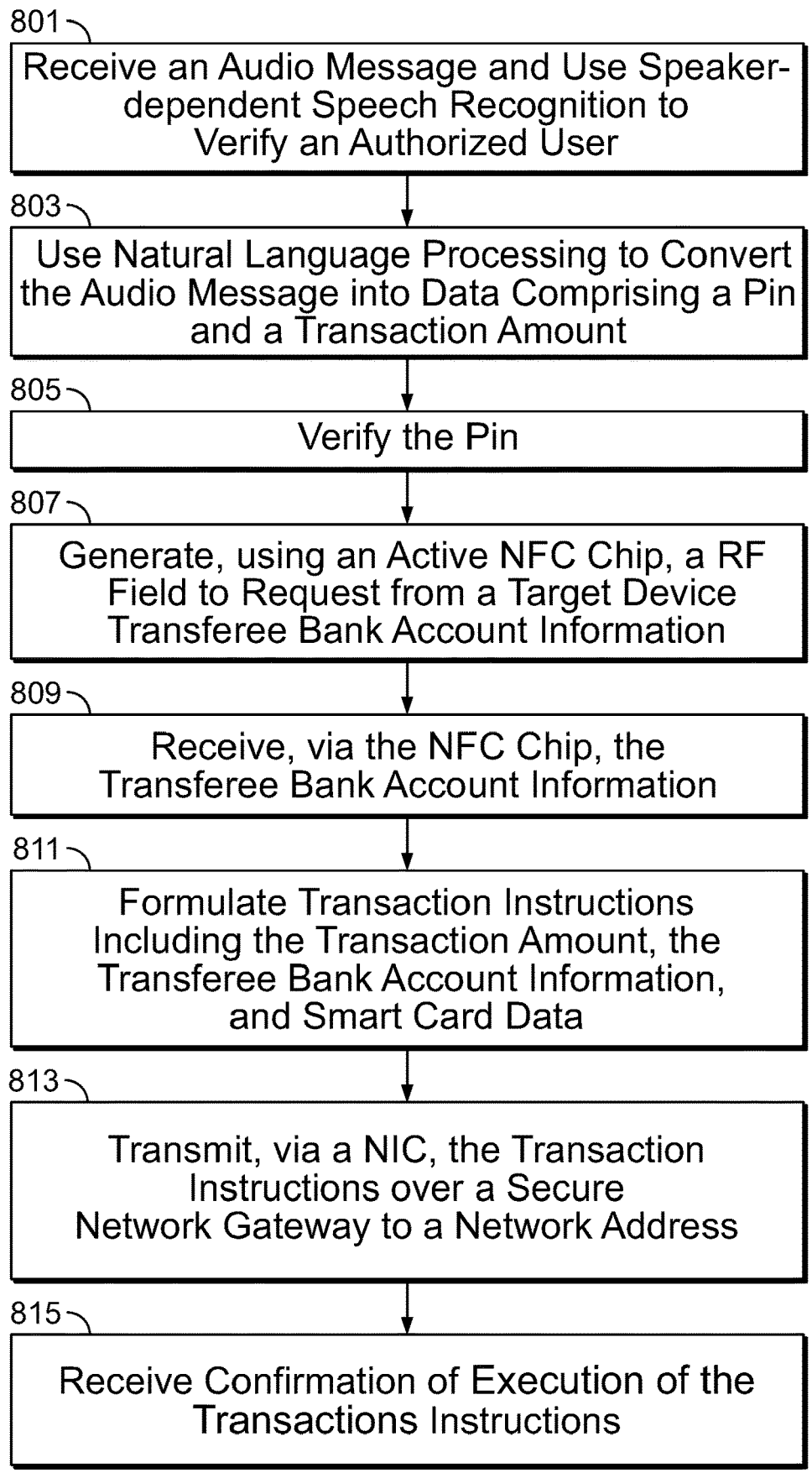
FIG. 8 shows an illustrative method in accordance with principles of the disclosure.

FIG. 8 shows an illustrative method. Methods may include some or all of method steps 801-815. Methods may include the steps illustrated in FIG. 8 performed in an order different from the illustrated order. The illustrative method shown in FIG. 8 may include one or more steps performed in FIG. 7 or described herein.

At step 801, a smart card in accordance with the invention may receive an audio message. The smart card may use speaker-dependent speech recognition to verify that the audio message was generated by an authorized user of the smart card. At step 803, the smart card may use natural language processing ("NLP") to convert the audio message into data comprising a PIN and a transaction amount. At step 805, the smart card may verify the PIN. At step 807 the smart card may generate, using an active NFC chip, a RF field to request from a target device transferee bank account information. The target device may be a second smart card. The target device may be a POS device, a smart phone, a laptop, a computer, a passive NFC device, or any other suitable device.

At step 809, the smart card may receive, from the NFC chip, transferee bank account information. At step 811, the smart card may formulate transaction instructions. The transaction instructions may include the transaction amount, the transferee bank account information and smart card data. The smart card data may be first card ID data or any other suitable data. At step 813, the smart card may transmit, via a NIC, the transaction instructions over a secure network gateway to a network address. The secure network gateway may be the transaction gateway. At step 815, the smart card may receive a confirmation of execution of the transaction instructions. The confirmation may be received by the NIC over the secure network gateway. The confirmation may be generated by an issuing bank of the smart card.

Thus, methods and apparatus for SMART CARD USING NATURAL LANGUAGE PROCESSING FOR ORIGINATING CONTACTLESS DATA TRANSFER are provided. Persons skilled in the art will appreciate that the present invention can be practiced by other than the described embodiments, which are presented for purposes of illustration rather than of limitation, and that the present invention is limited only by the claims that follow.

What is claimed is:

1. A smart card responsive to voice commands and supporting electronic communication with a payment network, the smart card having a thickness not greater than 0.8 millimeters ("mm") and a surface area not greater than 86 mm×54 mm, the smart card comprising:
    a housing;
    a nano network interface controller ("NIC") embedded in the housing, the NIC including a wireless communication interface;
    a voice controller including a sound card, a microphone and a speaker;
    an active near-field communication ("NFC") chip;
    a microprocessor embedded in the housing, the microprocessor being in electronic communication with the NIC, the voice controller and the NFC chip;
    a battery, embedded in the housing, for powering the NIC, the microprocessor, the voice controller and the NFC;
    an activation button; and
    executable instructions stored in a non-transitory memory, that when run by the microprocessor:
        activate the voice controller in response to activation of the activation button;
        via the voice controller, detect and capture a first audio message;
        perform speaker-dependent speech recognition on the captured audio message, the speech recognition comprising comparing segments of the first audio message to pre-saved captured sound stored locally in the memory;
        when the speech recognition determines that the first audio message was generated by a user of the smart card, using natural language processing ("NLP") to convert the first audio message into machine readable transaction data comprising a transaction amount;
        generate, using the NFC chip, a radio-frequency field for requesting, from a target device including an active or passive NFC chip, transferee bank account information;
        receive from the target device, using the NFC chip, the transferee bank account information;
        using the microprocessor, formulate a set of transaction instructions including a bank account number associated with the smart card, the transaction amount and the transferee bank account information;
        using the wireless interface, establish a direct communication channel with the payment network via a secure transaction gateway using a network address stored locally in the memory;
        using the wireless interface, transmit to the network address the transaction instructions; and
        in response to receiving confirmation from the payment network via the secure transaction gateway, via the communication channel, that the transaction instructions have been successfully executed, generating, using the voice controller, a second audio message confirming approval of the transaction instructions;
    wherein:
        the smart card establishes the direct communication channel with the payment network independent of a POS device, thereby providing for POS device-independent initiation of transactions.

2. The smart card of claim 1 wherein the battery powers the active NFC chip with no more than 40 mA of power.

3. The smart card of claim 1 wherein the radio-frequency field includes sufficient power to power a passive NFC chip.

4. The smart card of claim 1 wherein the network address stored in the non-transitory memory is associated with an issuer of the smart card.

5. The smart card of claim 1 wherein the executable instructions stored in the non-transitory memory, when run by the microprocessor, encrypts the transaction instructions such that the transaction instructions are decryptable by the payment network.

6. The smart card of claim 1 further comprising a biometric reader, wherein the executable instructions stored in the non-transitory memory, when run by the microprocessor, require a capturing, using the biometric reader, of a valid biometric feature before submitting the transaction instructions to the payment network.

7. The smart card of claim 1 further comprising a keypad, the keypad being configured to receive numerical input from the user.

8. The smart card of claim 1 further comprising at least one electrical contact accessible through the housing, wherein the battery is configured to be recharged via the at least one electrical contact when the smart card is inserted into a card reader.

9. The smart card of claim 1 wherein:
    the voice controller comprises:
        an inactive state in which the voice controller is unable to capture audio messages; and
        an active state in which the voice controller is capable to capturing audio messages; and the microprocessor toggles the voice controller from the inactive state to the active state in response to activation of the activation button;

wherein:
when the voice controller is in the inactive state, the wireless interface is unable to transmit data; and
when the voice controller is in the active state, the wireless interface is capable of transmitting data.

10. The smart card of claim 9 wherein, when the speech recognition determines that the first audio message was not generated by a user of the smart card, the executable instructions stored in the non-transitory memory, when run by the microprocessor:
terminate analysis of the first audio message; and
using the microprocessor, maintain the wireless interface in a state in which the wireless interface is unable to transmit data.

11. The smart card of claim 1 wherein:
the activation button is depressible; and
the activation button is activated by depression of the activation button.

12. The smart card of claim 1 wherein the wireless interface does not transmit the transaction instructions to the transaction gateway until capturing a third audio message, by the voice controller, that, which analyzed by the speech recognition and NLP, includes an authorization, from the user, to initiate the transaction.

13. A smart card responsive to voice commands and supporting electronic communication with a payment network, the smart card having a thickness not greater than 0.8 millimeters ("mm") and a surface area not greater than 86 mm×54 mm, the smart card comprising:
a housing;
a nano network interface controller ("NIC") embedded in the housing, the NIC including a wireless communication interface;
a voice controller including a sound card, a microphone and a speaker;
an active near-field communication ("NFC") chip;
a microprocessor embedded in the housing, the microprocessor being in electronic communication with the NIC, the voice controller and the NFC chip;
a battery, embedded in the housing, for powering the NIC, the microprocessor, the voice controller and the NFC;
an activation button; and
executable instructions stored in a non-transitory memory, that when run by the microprocessor:
activate the voice controller in response to activation of the activation button;
via the voice controller, detect and capture a first audio message;
perform speaker-dependent speech recognition on the captured audio message, the speech recognition comprising comparing segments of the first audio message to pre-saved captured sound stored locally in the memory;
when the speech recognition determines that the first audio message was generated by a user of the smart card, using natural language processing ("NLP") to convert the first audio message into machine readable transaction data comprising a transaction amount and recipient data;
using the microprocessor, formulate a set of transaction instructions including the transaction amount, the recipient data, and smart card identifying data;
using the wireless interface, establish a direct communication channel with the payment network via a secure transaction gateway using a network address stored locally in the memory;
using the wireless interface, transmit to the network address the transaction instructions; and
in response to receiving confirmation from the payment network via the secure transaction gateway, via the communication channel, that the transaction instructions have been successfully executed, generating, using the voice controller, a second audio message confirming approval of the transaction instructions;

wherein:
the smart card supports autonomous smart card transaction initiation by generating transaction instructions over the secure network without receiving input identifying a recipient from a device different from the smart card.

14. The smart card of claim 13 wherein:
the smart card is a debit card; and
the smart card identifying data includes a bank account number associated with the smart card.

15. The smart card of claim 13 wherein the recipient data is a name.

16. The smart card of claim 13 wherein the recipient data is an alphanumeric string.

17. A system for supporting autonomous smart card transactions, the system including:
a smart card responsive to voice commands and supporting electronic communication with a transaction platform, the smart card having a thickness not greater than 0.8 millimeters ("mm") and a surface area not greater than 86 mm×54 mm, the smart card comprising:
a housing;
a nano network interface controller ("NIC") embedded in the housing, the NIC including a wireless communication interface;
a voice controller including a sound card, a microphone and a speaker;
an active near-field communication ("NFC") chip;
a microprocessor embedded in the housing, the microprocessor being in electronic communication with the NIC, the voice controller and the NFC chip;
a battery, embedded in the housing, for powering the NIC, the microprocessor, the voice controller and the NFC;
an activation button; and
executable instructions stored in a non-transitory memory;
the transaction platform supporting communications over a secure transaction gateway and being associated with a network address;
the executable instructions, when run by the microprocessor on the smart card:
activate the voice controller in response to activation of the activation button;
via the voice controller, detect and capture a first audio message;
using the microprocessor, formulate a transaction communication, the transaction communication including the first audio message and smart card identifying data;
using the wireless interface, establish a direct communication channel with the secure transaction gateway using the network address, the network address being stored locally in the memory; and
using the wireless interface, transmit to the network address the transaction communication;

the transaction platform is configured to:
- receive the transaction communication;
- use the smart card identifying data to identify a user account linked to the smart card;
- perform speaker-dependent speech recognition on the captured audio message, the speech recognition comprising comparing segments of the first audio message to pre-saved captured sound associated with a user of the smart card and accessible to the transaction platform;
- when the speech recognition determines that the first audio message was generated by the user of the smart card, using natural language processing ("NLP") to convert the first audio message into machine readable transaction data comprising a transaction amount and recipient data;
- correlate the recipient data with stored recipient data associated with the user account, the stored recipient data including a recipient account;
- confirm that sufficient funds are in the user account to cover the transaction amount;
- after the confirmation, initiating a transfer of funds equal to the transaction amount from the user account to the recipient account; and
- transmitting to the smart card, via the secure transaction network, confirmation that instructions included in the first audio message have been fulfilled; and in response to receiving the confirmation from the transaction platform, generating, using the voice controller, a second audio message confirming approval of the transaction instructions.

18. The smart card of claim 17 wherein, when the speech recognition determines that the audio message was not generated by the user of the smart card, transmitting a warning message, to the smart card.

19. The smart card of claim 17 wherein the recipient data is a name.

20. The smart card of claim 17 wherein the recipient data is an alphanumeric string.

* * * * *